United States Patent [19]

Thompson

[11] 4,172,634
[45] Oct. 30, 1979

[54] CAM FOLLOWER FOR VARIABLE POWER SCOPES

[75] Inventor: John F. Thompson, El Paso, Tex.

[73] Assignee: W. R. Weaver Company, El Paso, Tex.

[21] Appl. No.: 837,484

[22] Filed: Sep. 28, 1977

[51] Int. Cl.² .................. G02B 15/16; G02B 7/10
[52] U.S. Cl. .................... 350/187; 350/44; 350/255
[58] Field of Search .............. 350/44, 43, 42, 40, 350/54, 187, 255, 247

[56] References Cited

U.S. PATENT DOCUMENTS

| 2,006,464 | 7/1935 | Laube et al. ............... 350/255 |
| 2,537,561 | 1/1951 | Waitt ........................ 350/187 |
| 3,423,146 | 1/1969 | Weaver ....................... 350/44 |

FOREIGN PATENT DOCUMENTS 1169280 4/1964 Fed. Rep. of Germany ........... 350/187

Primary Examiner—Jon W. Henry
Attorney, Agent, or Firm—William W. Jones; Paul J. Lerner

[57] ABSTRACT

A mechanism for varying the power of a telescopic gun sight wherein the erector lenses are moved longitudinally of the sight. A cam sleeve is used in combination with plastic cam followers. Screws are passed through the cam followers and threaded into the erector lens cells to bias runners formed on the lens cells against the inside surface of the erector lens tube thereby loosening manufacturing tolerance requirements while providing smoother and more accurate lens movement and power change.

2 Claims, 3 Drawing Figures

CAM FOLLOWER FOR VARIABLE POWER SCOPES

This invention relates to an improved mechanism for changing the power of a variable power telescopic gunsight. More particularly, an improved camming mechanism is disclosed for moving the erector lenses in the gunsight thereby varying the power of the gunsight.

The most common mechanism used today to vary the power of a variable power telescopic gunsight, or scope, is a camming mechanism which employs a power change ring on the exterior of the scope which, when rotated, results in axial movement of the erector lenses of the scope. A connection is made between the power change ring and the erector lenses, which connection usually includes one or more cam slots and cam followers which convert the rotational movement of the ring into axial movement of the lenses. U.S. Pat. No. 3,423,146, issued Jan. 21, 1969 to W. R. Weaver discloses one particular form of the mechanism generally described above.

When employing a power change mechanism which involves moving the erector lenses, which, in modern day scopes, are mounted in a pivoting tube within the scope barrel, the interior of the tube must be finely honed to a smooth finish, and the exterior of the erector lens cells should be precision formed so that a tight but smoothly adjustable fit is obtained between the erector lens cells and the erector tube. This is desirable so that smooth lens movement can be effected, and so that the lens cells cannot pivot or become jammed or cocked within the erector tube. The guiding function of the moving erector lenses is provided by the outside of the erector lens cells and the inside surface of the erector tube.

It will be readily appreciated that the close tolerances desired are difficult to achieve and are expensive to produce. In order to somewhat loosen the tight dimensional tolerance requirements and to reduce friction generated during erector lens movement, U.S. Pat. No. 3,423,146 referred to above describes an improved erector lens cell which has axially extending and circumferentially restricted raised runners which contact the interior of the erector lens tube.

This invention is an improvement of the above-described power change mechanism, and preferably employs erector lens cells having raised runners. An axial slot is cut through the erector tube and an annular cam sleeve is closely fitted about the erector tube. A pair of helical cam slots are cut in the cam sleeve, there being one cam slot for each erector lens being moved. One of the cam slots is preferably of constant pitch and the other is preferably of varying pitch. The outer corners of the erector tube axial slot is preferably formed with coplanar flats which are chordal to the outer surface of the erector tube. A plastic cam follower of generally annular configuration is disposed in each cam slot and each of the cam followers extends into the axial slot of the erector tube. Eacn cam follower has a through bore through which a screw extends. Each screw is threaded into a threaded port in its respective erector lens cell, with the ports being disposed between the lens cell runners. Tightening of the screws pulls the lens cell runners against the inside surface of the erector tube and also pulls the cam followers against the coplanar flats on the erector tube outer surface. Thus, the tightness of the fit between the erector lens cells and the erector tube can be closely controlled and varied without the need of honing or closely controlling the inside diameter of the erector tube. The flats on the erector tube outer surface also provide area contact for the cam followers resulting in smoother start-up and movement of the erector lenses. Each of the cam followers is provided with opposed flats on its outer surface which flats provide area contact with the sides of the cam slots to, again, provide a smoother operation. The cam follower, which is disposed in the varying pitch cam slot, swivels about its screw so as to accomodate the varying pitch of the cam slot while maintaining the area contact between the follower flats and the side walls of the cam slot.

It is, therefore, an object of this invention to provide an improved mechanism for varying the power of a variable power telescopic sight by moving lenses of the scope.

It is a further object of this invention to provide an improved mechanism of the character described wherein a cam slot arrangement is utilized having plastic cam followers slidably disposed therein.

It is yet another object of this invention to provide an improved mechanism of the character described wherein the cam followers are adjustably connected to the lenses being moved so that the tightness of the fit between the lens cells and the scope member in which they are slidably mounted can be adjusted.

It is an additional object of this invention to provide an improved mechanism of the character described which is smoothly and dependably operable without requiring particularly close tolerance interfitting of the several parts of the mechanism.

These and other objects and advantages of the invention will become more readily apparent to those skilled in the art from the following detailed description of a preferred embodiment of the invention taken in conjunction with the accompanying drawing, in which.

Figure 1:
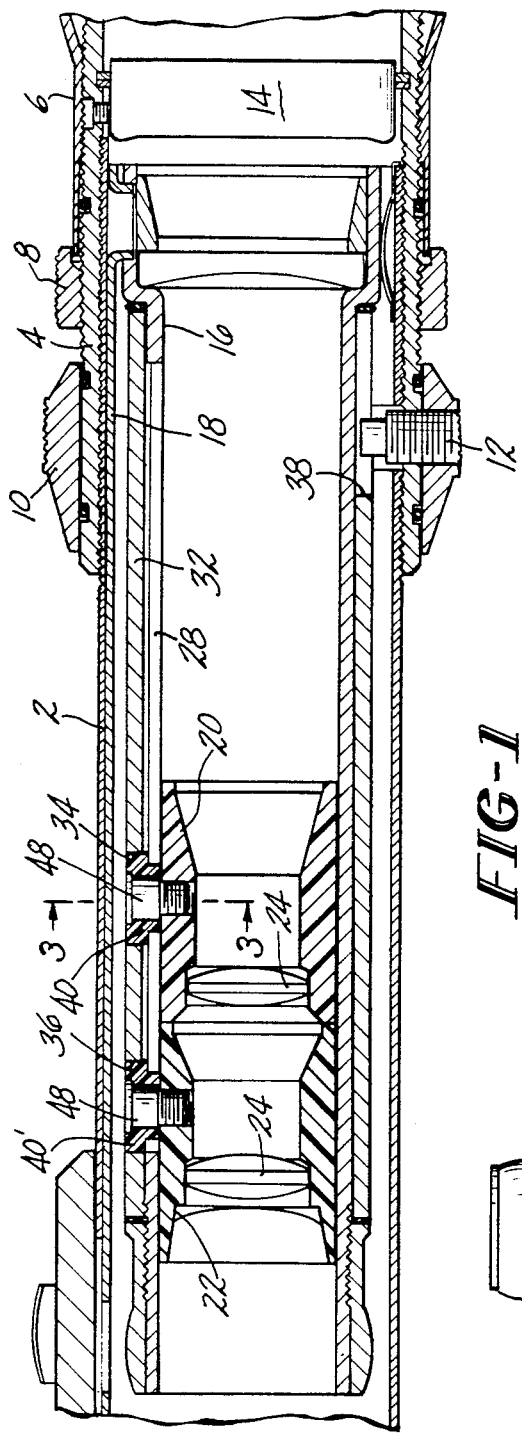
FIG. 1 is an axial sectional view of a portion of a variable power telescopic gunsight employing the invention with the ocular and objective ends of the sight being omitted for purposes of clarity.

Referring now to the drawings, there is shown in FIG. 1 the pertinent portion of a telescopic gunsight of variable power which employs a preferred embodiment of the lens-shifting mechanism. The scope includes a main barrel portion 2 onto which is threaded a barrel extension 4. The ocular lens housing 6 is threaded onto the barrel extension 4 and properly positioned by a locking ring 8. The power change ring 10 is rotatably mounted on the barrel extension, the ring 10 carrying a lug 12 which extends radially into the interior of the scope.

Mounted inside the barrel extension 4 is a reticle cell 14. Forward of the reticle cell 14, there is positioned the erector lens tube 16 which is pivotally mounted within the scope barrel 2 on a support member 18 which is described in U.S. Pat. No. 3,962,795, issued June 15, 1976 to C. J. Ross. Disposed within the erector tube 16 are a pair of erector lens cells 20 and 22 which are adapted to slide longitudinally within the erector tube 16. The erector lens cells are preferably made from an acetal resin impregnated with Teflon (trademark)

which resin is sold by Liquid Nitrogen Corporation, Santa Ana, California under the trademark Fulton 404. This resin has an inherant lubricity which enhances the operation of the mechanism of this invention. An erector lens 24 is mounted in each lens cell 20 and 22. Each lens cell 22 is provided with a pair of longitudinally extending, circumferentially spaced runners 26 (see FIG. 3) which bear against the inside surface of the erector tube 16.

The erector tube 16 is provided with a straight longitudinally extending slot 28 upwardly terminating in flats 30. Mounted on the outside of the erector tube 16 for rotational movement thereabout is a cam sleeve 32. The cam sleeve 32 is provided with a pair of helical slots 34 and 36. The rearwardmost cam slot 34 has a constant pitch and the forwardmost cam slot 36 has a varied pitch in the preferred embodiment shown. The rearward end of the cam sleeve 32 is provided with a straight slot 38 which receives the inner end of the power change lug 12 (see FIG. 1).

Figure 3:
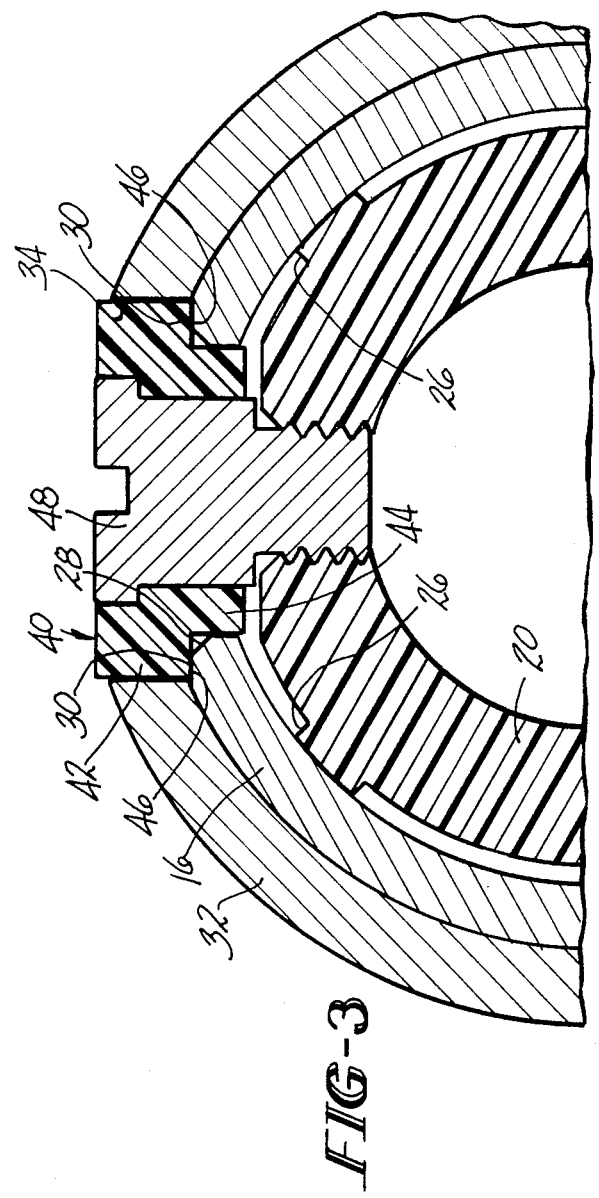
FIG. 3 is a sectional view taken along line 3—3 of FIG. 1 showing the manner in which the cam followers and lens cells are mounted in place within the sight.

Referring now especially to FIG. 3, an annular cam follower 40 is disposed in the slots 34, 36, and 28. The follower 40 has an enlarged portion 42 which engages the walls of the cam slots 34 and 36 and a reduced portion 44 which engates the walls of the cam slots 34 and 36 and a reduced portion 44 which engages the walls of the erector tube slot 28. Bridging the enlarged and reduced portions 42 and 44 on the cam follower 40 is a radial shoulder 46 which engages and rides on the flats 30 formed on the erector tube 16.

Figure 2:
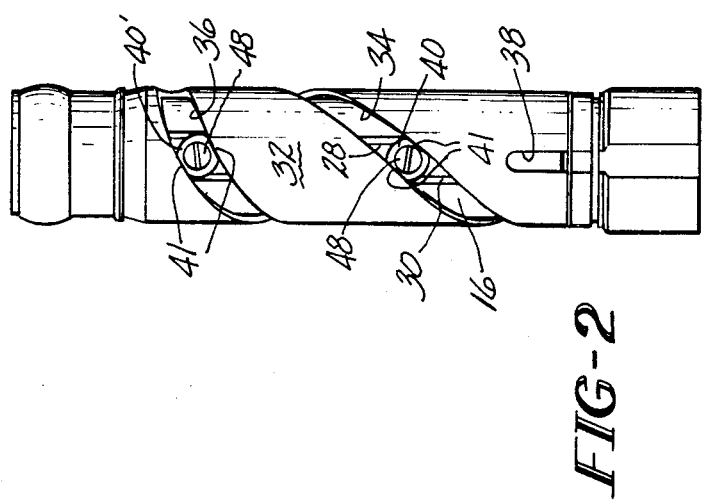
FIG. 2 is a plan view of the erector tube-cam sleeve sub-assembly of the sight of FIG. 1 showing the cam slots and cam followers of the invention.

It will be noted from FIG. 2 that there is one cam follower 40 in the constant pitch cam slot 34 and another cam follower 40' in the varied pitch cam slot 36. It will also be noted that the enlarged portions 42 of each cam follower 40 and 40' are formed with opposed flats 41 which provide area contact with the cam slots 34 and 36 to increase the smoothness of operation of the mechanism. The cam followers 40 and 40' are preferably made from nylon so as to provide smoothness of operation. The cam followers 40 and 40' are held in place by screws 48 which pass through a through bore in each cam follower and which are threaded into the erector lens cells 20 and 22. As can be seen in FIG. 3, the screws 48 enter the lens cells 20 and 22 circumferentially between the runners 26, thus tightening of the screws 48 will draw the runners 26 against the inside surface of the erector tube 16. Thus the screws 48 obviate the need to finely polish and carefully control the inside diameter of the erector tube, as well as provide a means whereby the friction generated between the lens cells 20 and 22 and the inside surface of the erector tube 16 can be controlled. The flats 30 on the erector tube 16 through their engagement by the cam followers 40 and 40' provide the means whereby the lens cells 20 and 22 can be drawn up against the inside surface of the erector tube. As previously stated, the cam slot 36 has a varying pitch, therefore, the cam follower 40' is mounted so that it will swivel about the screw 48 to maintain the area contact between the follower flats 41 and the side walls of the cam slot 36. The other cam follower 40 can also be made to swivel if so desired, however, with a constant pitch cam slot this is not a required feature.

Operation of the mechanism will now briefly be described. The mechanism can be properly assembled and the screws 48 tightened to provide the desired frictional contact between the lens cells 20 and 22 and the interior of the erector tube 16 whereupon power change in the scope is accomplished as follows. The ring 10 is rotated about the scope barrel to cause angular displacement of the lug 12. Thus the lug 12 is moved against the sides of the slot 38 causing the cam sleeve 32 to rotate. The erector tube 16 is prevented from rotating by the mount 18. Rotation of the cam sleeve 32 results in angular displacement of the cam slots 34 and 36 thus pushing the cam followers 40 and 40' and the screws 48 through the longitudinal slot 28 in the erector tube 16. Thus the erector lens cells 20 and 22 are moved through the erector lens 16. By having differing helical pitches on the cam slots, the spacing between the erector lenses can be changed as the cells move, and the power of the scope will thus be varied.

It will be readily appreciated that the mechanism of this invention provides a number of improved operating characteristics. Smooth lens movement is accomplished without requiring honing of the erector lens tube by using the lens cell runners and screw-cam follower combination. Using plastic cam followers and lens cells also provides smooth operation as it permits the use of plastic materials having low coefficients of friction.

Since many changes and variations of the disclosed embodiment of the invention may be made without departing from the inventive concept, it is not intended to limit the invention otherwise than as required by the appended claims.

What is claimed is:

1. In an optical gunsight lens-moving mechanism, the combination comprising:
   (a) a tubular body having a bore;
   (b) a lens cell containing a lens to be moved, said lens cell being disposed within said tubular body bore, said lens cell having an outer surface formed with at least two axially extending circumferentially offset raised runners;
   (c) means forming a slot in said tubular body;
   (d) screw means extending through said tubular body slot and threaded into said lens cell at a location circumferentially between said runners, said screw means being operable to pull said runners against said tubular body bore surface;
   (e) a cam sleeve surrounding said tubular body and rotatable thereon, said cam sleeve having at least one helical slot formed therein, said screw means extending through said helical slot;
   (f) means for rotating said cam sleeve about its own axis; and
   (g) a cam follower disposed in said tubular body slot and said helical slot, said screw means passing through a bore in said cam follower, said cam follower including substantially flat side surfaces providing area contact with the sides of said helical slot, said cam follower swiveling upon said screw means,
   (h) said tubular body being formed with chordal flats on either side of said tubular body slot and said cam follower being formed with a shoulder engaging said chordal flats to provide a bearing means against which said lens cell runners may be pulled against said tubular body bore surface.

2. In an optical gunsight, a power change mechanism comprising:
   (a) an erector tube pivotally mounted within a main barrel portion of the gunsight, said erector tube including a longitudinally extending slot formed therein;
   (b) a pair of erector lens cells mounted in said erector tube, at least one of said cells being movable longitudinally within said erector tube;

(c) a cam sleeve mounted on said erector tube for rotation thereabout, said cam sleeve being formed with at least one helical cam slot therein;

(d) an annular cam follower disposed in said helical cam slot and engaging said erector tube adjacent to said longitudinally extending slot;

(e) screw means extending through said cam follower and threaded into said movable lens all to pull said cam follower against said erector tube and to pull said movable erector lens all against the inside surface of said erector tube, said erector tube being provided with chordal flats adjacent said longitudinally extending slot and said cam follower including shoulder means seated upon said chordal flats; and (f) means on the exterior of the sight manually operable for rotating said cam sleeve.

* * * * *